(12) United States Patent
Schwartz et al.

(10) Patent No.: US 11,498,022 B2
(45) Date of Patent: Nov. 15, 2022

(54) OVAL SEAL WITH STABILIZATION CONTOUR

(71) Applicant: CUMMINS FILTRATION IP, INC., Columbus, IN (US)

(72) Inventors: Scott W. Schwartz, Cottage Grove, WI (US); Jessie A. Knight, Oregon, WI (US); Michael T. Zuroski, Sun Prairie, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 226 days.

(21) Appl. No.: 16/769,742

(22) PCT Filed: Dec. 5, 2018

(86) PCT No.: PCT/US2018/063976
§ 371 (c)(1),
(2) Date: Jun. 4, 2020

(87) PCT Pub. No.: WO2019/113152
PCT Pub. Date: Jun. 13, 2019

(65) Prior Publication Data
US 2020/0384402 A1     Dec. 10, 2020

Related U.S. Application Data

(60) Provisional application No. 62/596,371, filed on Dec. 8, 2017.

(51) Int. Cl.
*B01D 46/24* (2006.01)
*B01D 46/00* (2022.01)
*B01D 46/10* (2006.01)

(52) U.S. Cl.
CPC ..... *B01D 46/2414* (2013.01); *B01D 46/0005* (2013.01); *B01D 46/10* (2013.01);
(Continued)

(58) Field of Classification Search
CPC .......... B01D 46/2414; B01D 2271/027; B01D 2275/208; B01D 46/2411; B01D 46/0005; B01D 46/10; B01D 2265/06
See application file for complete search history.

(56) References Cited

U.S. PATENT DOCUMENTS

| 2,108,283 A | 2/1938 | Drew et al. |
| 3,295,687 A | 1/1967 | Schmerler |

(Continued)

FOREIGN PATENT DOCUMENTS

| CN | 1652859 | 8/2005 |
| CN | 102258918 | 11/2011 |

(Continued)

OTHER PUBLICATIONS

Office Action for U.S. Appl. No. 16/115,040 dated Jun. 22, 2020, 11 pages.

(Continued)

*Primary Examiner* — Robert Clemente
(74) *Attorney, Agent, or Firm* — Foley & Lardner LLP

(57) ABSTRACT

A filter element including a first endplate, a second endplate, filter media fitted between the first endplate and the second endplate, the first endplate including an opening that allows a working fluid to flow into or out of the filter media, the filter media allowing the working fluid to be filtered through the filter media and a seal member having an oval profile disposed on the first endplate and configured to seal with a filter housing, the seal member including an inner perimeter and an outer perimeter including a plurality of outwardly curved surfaces.

20 Claims, 8 Drawing Sheets

(52) U.S. Cl.
CPC .... *B01D 2265/06* (2013.01); *B01D 2271/027* (2013.01); *B01D 2275/208* (2013.01)

(56) References Cited

U.S. PATENT DOCUMENTS

| | | | |
|---|---|---|---|
| 3,786,926 A | 1/1974 | Wilhelm | |
| 4,613,438 A | 9/1986 | Degraffenreid | |
| 4,916,001 A | 4/1990 | Whittenberger et al. | |
| D326,706 S | 6/1992 | Karlsson | |
| 5,609,761 A | 3/1997 | Franz | |
| 5,800,580 A | 9/1998 | Feldt | |
| 5,803,941 A | 9/1998 | Berkhoel et al. | |
| 5,954,849 A | 9/1999 | Berkhoel et al. | |
| D437,402 S | 2/2001 | Gieseke et al. | |
| 6,197,191 B1 | 3/2001 | Wobben | |
| D449,102 S | 10/2001 | Shin | |
| 6,364,921 B1 | 4/2002 | Raether et al. | |
| 6,387,162 B1 | 5/2002 | Kosmider et al. | |
| 6,398,836 B1 | 6/2002 | Frankle | |
| 6,485,544 B1 | 11/2002 | Ziske | |
| 6,488,746 B1 | 12/2002 | Kosmider et al. | |
| D475,781 S | 6/2003 | Mattsson et al. | |
| D483,459 S | 12/2003 | Dewit et al. | |
| D484,584 S | 12/2003 | Anderson et al. | |
| D497,202 S | 10/2004 | Carter et al. | |
| D499,177 S | 11/2004 | Kosmider et al. | |
| 6,902,598 B2 | 6/2005 | Gunderson et al. | |
| 6,966,940 B2 | 11/2005 | Krisko et al. | |
| D525,120 S | 7/2006 | Maskell et al. | |
| 7,147,110 B2 * | 12/2006 | Clausen | B01D 36/001 210/450 |
| D545,396 S | 6/2007 | Casey et al. | |
| 7,264,656 B2 | 9/2007 | Kosmider et al. | |
| 7,282,077 B2 | 10/2007 | Honisch et al. | |
| 7,332,009 B2 | 2/2008 | Casey et al. | |
| 7,442,221 B2 | 10/2008 | Ruhland et al. | |
| 7,670,403 B2 | 3/2010 | Modesto et al. | |
| 7,828,870 B1 | 11/2010 | Rech et al. | |
| RE42,174 E | 3/2011 | Gunderson et al. | |
| 8,097,061 B2 | 1/2012 | Smith et al. | |
| 8,182,569 B2 | 5/2012 | Casey et al. | |
| 8,241,384 B2 | 8/2012 | Schrage et al. | |
| 8,245,851 B2 | 8/2012 | Hawkins et al. | |
| 8,394,164 B2 | 3/2013 | Casey et al. | |
| 8,397,920 B2 | 3/2013 | Moy et al. | |
| D690,407 S | 9/2013 | Williams et al. | |
| D692,298 S | 10/2013 | Pipes et al. | |
| 8,613,784 B2 | 12/2013 | Heckel et al. | |
| 8,632,619 B2 | 1/2014 | Komori et al. | |
| 8,685,128 B2 | 4/2014 | Schrage et al. | |
| D706,831 S | 6/2014 | Schultz | |
| 8,864,866 B2 | 10/2014 | Osendorf et al. | |
| 8,961,637 B2 | 2/2015 | Raether et al. | |
| D736,263 S | 8/2015 | Schultz | |
| 9,168,477 B2 | 10/2015 | Schulz et al. | |
| 9,205,361 B2 | 12/2015 | Menssen et al. | |
| 9,308,482 B2 | 4/2016 | Kaiser | |
| 9,320,997 B2 | 4/2016 | Campbell et al. | |
| 9,358,489 B2 | 6/2016 | Kaufmann et al. | |
| 9,415,333 B2 | 8/2016 | Kindkeppel et al. | |
| 9,446,339 B2 | 9/2016 | Rieger et al. | |
| 9,463,405 B2 | 10/2016 | Bartel et al. | |
| 9,604,856 B2 | 3/2017 | Fall | |
| 9,610,529 B2 | 4/2017 | Mills et al. | |
| 9,623,351 B2 | 4/2017 | Kindkeppel et al. | |
| 9,636,615 B2 | 5/2017 | Osendorf et al. | |
| 9,649,581 B2 | 5/2017 | Conroy | |
| 9,682,339 B2 | 6/2017 | Jursich et al. | |
| D793,453 S | 8/2017 | Krull | |
| D794,082 S | 8/2017 | Krull | |
| D798,907 S | 10/2017 | Krull | |
| D799,657 S | 10/2017 | Sullivan et al. | |
| D804,004 S | 11/2017 | Madeira et al. | |
| 9,849,408 B2 | 12/2017 | Stehle et al. | |
| D819,698 S | 6/2018 | Krull | |
| D819,699 S | 6/2018 | Krull | |
| 9,987,571 B2 | 6/2018 | Klein et al. | |
| D852,345 S | 6/2019 | Stanhope et al. | |
| D884,866 S | 5/2020 | Knight et al. | |
| 10,758,859 B2 | 9/2020 | Gieseke et al. | |
| D909,557 S | 2/2021 | Jeon et al. | |
| D911,642 S | 2/2021 | Burgess et al. | |
| 10,918,978 B2 | 2/2021 | Knight et al. | |
| D926,961 S | 8/2021 | Lee | |
| D930,136 S | 9/2021 | Knight et al. | |
| D935,587 S | 11/2021 | Wu | |
| 11,198,082 B2 | 12/2021 | Rahn et al. | |
| 2003/0168398 A1 | 9/2003 | Steger et al. | |
| 2004/0035097 A1 | 2/2004 | Schlensker et al. | |
| 2004/0238437 A1 | 12/2004 | Nguyen et al. | |
| 2006/0070945 A1 | 4/2006 | Men et al. | |
| 2006/0096908 A1 | 5/2006 | Wolf et al. | |
| 2007/0000830 A1 | 1/2007 | Snider et al. | |
| 2007/0193236 A1 | 8/2007 | Merritt | |
| 2008/0029453 A1 | 2/2008 | Mertens et al. | |
| 2008/0041026 A1 | 2/2008 | Engel et al. | |
| 2008/0245719 A1 | 10/2008 | Beard et al. | |
| 2009/0064646 A1 | 3/2009 | Reichter et al. | |
| 2009/0188220 A1 | 7/2009 | Freisinger et al. | |
| 2010/0000922 A1 | 1/2010 | Crawford | |
| 2010/0064646 A1 | 3/2010 | Smith et al. | |
| 2010/0252495 A1 | 10/2010 | Reid et al. | |
| 2011/0210053 A1 | 9/2011 | Strassenberger | |
| 2012/0160755 A1 | 6/2012 | Lacroix et al. | |
| 2012/0223001 A1 | 9/2012 | Beard | |
| 2012/0246907 A1 | 10/2012 | Morgan | |
| 2013/0140227 A1 | 6/2013 | Stehle et al. | |
| 2013/0228504 A1 | 9/2013 | Mcelroy et al. | |
| 2013/0255203 A1 | 10/2013 | Muenkel et al. | |
| 2014/0137525 A1 | 5/2014 | Cambpell et al. | |
| 2014/0165834 A1 | 6/2014 | Kaufmann et al. | |
| 2014/0373495 A1 * | 12/2014 | Madeira | B01D 46/2411 55/502 |
| 2015/0020488 A1 | 1/2015 | Dhiman et al. | |
| 2015/0101295 A1 | 4/2015 | Thompson et al. | |
| 2015/0151233 A1 | 6/2015 | Johnson et al. | |
| 2015/0343339 A1 | 12/2015 | Johnson et al. | |
| 2015/0343359 A1 * | 12/2015 | Neef | B01D 46/64 55/495 |
| 2016/0045848 A1 | 2/2016 | Campbell et al. | |
| 2016/0051912 A1 | 2/2016 | Castaneda et al. | |
| 2016/0131094 A1 * | 5/2016 | Pereira Madeira | F02M 35/02483 96/414 |
| 2016/0263495 A1 | 9/2016 | Wyhler et al. | |
| 2016/0296867 A1 | 10/2016 | Stark et al. | |
| 2016/0325212 A1 | 11/2016 | Pflueger et al. | |
| 2017/0102101 A1 | 4/2017 | Duval-Arnould | |
| 2017/0291129 A1 * | 10/2017 | Sorger | B01D 46/60 |
| 2017/0361249 A1 | 12/2017 | Ries et al. | |
| 2018/0015406 A1 | 1/2018 | Nelson et al. | |
| 2018/0043290 A1 | 2/2018 | Bautz et al. | |
| 2018/0050296 A1 | 2/2018 | Fritzsching et al. | |
| 2018/0161703 A1 | 6/2018 | Bautz et al. | |
| 2018/0200652 A1 | 7/2018 | Merritt et al. | |
| 2018/0318745 A1 * | 11/2018 | Nichols | B01D 35/153 |
| 2019/0060816 A1 * | 2/2019 | Wittmers | B01D 46/0005 |
| 2019/0070548 A1 * | 3/2019 | Franz | B01D 46/0005 |
| 2019/0070549 A1 | 3/2019 | Fritzsching et al. | |
| 2019/0111374 A1 | 4/2019 | Burton et al. | |
| 2019/0134546 A1 * | 5/2019 | Neef | F02M 35/0203 |
| 2019/0224604 A1 | 7/2019 | Lin et al. | |
| 2019/0270045 A1 * | 9/2019 | Donauer | B01D 46/2403 |
| 2019/0308123 A1 * | 10/2019 | Neef | F02M 35/02483 |
| 2019/0308124 A1 * | 10/2019 | Neef | F02M 35/0245 |
| 2019/0308125 A1 | 10/2019 | Neef et al. | |
| 2019/0308126 A1 * | 10/2019 | Fritzsching | B01D 46/2414 |
| 2019/0344207 A1 | 11/2019 | Knight et al. | |
| 2020/0054982 A1 | 2/2020 | Decoster et al. | |

(56) References Cited

U.S. PATENT DOCUMENTS

2020/0384402 A1 12/2020 Schwartz et al.
2021/0086109 A1 3/2021 Knight et al.

FOREIGN PATENT DOCUMENTS

| | | |
|---|---|---|
| CN | 202538551 U | 11/2012 |
| CN | 103126613 | 6/2013 |
| CN | 103861397 | 6/2014 |
| CN | 104159652 | 11/2014 |
| CN | 204041298 U | 12/2014 |
| CN | 106039878 | 10/2016 |
| CO | 2017008045 | 10/2017 |
| DE | 24 29 474 | 11/1975 |
| DE | 10 2004 063 346 A1 | 7/2006 |
| DE | 20 2009 000 969 | 7/2010 |
| DE | 10 2009 050 587 A1 | 4/2011 |
| DE | 10 2015 015 778 A1 | 7/2016 |
| DE | 10 2016 004 316 A1 | 1/2017 |
| DE | 10 2016 008 475 | 1/2017 |
| DE | 10 2016 004 317 | 10/2017 |
| DE | 10 2013 216 853 A1 | 1/2018 |
| EP | 0 923 975 B1 | 6/1999 |
| EP | 1 031 310 A2 | 8/2000 |
| FR | 2847488 A1 | 5/2004 |
| GB | 0 808 476 A | 2/1959 |
| GB | 2 346 568 | 8/2000 |
| GB | 2 375 494 | 11/2002 |
| JP | 4141226 | 5/2004 |
| WO | WO-03/084641 A2 | 10/2003 |
| WO | WO 2005/011838 | 2/2005 |
| WO | WO-2011/146474 A1 | 11/2011 |
| WO | WO-2013/104797 | 7/2013 |
| WO | WO-2015/061599 | 4/2015 |
| WO | WO-2015/171744 A1 | 11/2015 |
| WO | WO-2016/082854 A1 | 6/2016 |
| WO | WO-2016/100772 A1 | 6/2016 |
| WO | WO-2017/012932 A1 | 1/2017 |
| WO | WO-2017/079191 A1 | 5/2017 |

OTHER PUBLICATIONS

Office Action issued for U.S. Appl. No. 17/113,619 dated Feb. 9, 2022, 24 pages.

International Search Report &Written Opinion for PCT/US2018/063976 dated Feb. 6, 2019, 10 pages.

Office Action for Design U.S. Appl. No. 29/646,936 dated Jul. 10, 2019, 12 pages.

Preliminary Search Report for French Patent App. No. 1851888 dated Nov. 13, 2018, 8 pages.

First Office Action issued for Chinese Patent Application No. CN 201880086455.6 dated Jun. 3, 2021, 17 pages.

Notice of Allowance issued for Design U.S. Appl. No. 29/733,863 dated May 11, 2021, 7 pages.

International Search Report & Written Opinion for PCT/US2021/042780 dated Nov. 15, 2021, 13 pages.

Office Action issued for Colombian Patent Application No. CO NC2018/0012902 dated Nov. 29, 2021, 11 pages.

Requirement for Restriction Election issued for U.S. Appl. No. 29/726,762 dated Jan. 13, 2022, 23 pages.

* cited by examiner

US 11,498,022 B2

OVAL SEAL WITH STABILIZATION CONTOUR

CROSS REFERENCE TO RELATED APPLICATIONS

The present application is a national stage of PCT Application No. PCT/US2018/063976, filed Dec. 5, 2018 which claims priority to U.S. Provisional Patent Application No. 62/596,371, filed Dec. 8, 2017. The contents of these applications are incorporated herein by reference in their entirety and for all purposes.

TECHNICAL FIELD

The present disclosure relates to filtration systems for use with internal combustion engine systems or the like.

BACKGROUND

Air filter assemblies include filter elements inserted and sealed against air filter housings. When using air filter assemblies having non-circular sealing regions, it may be difficult to ascertain the correct alignment of a seal member into a corresponding sealing interface to ensure uniform compression or contact pressure around the perimeter of the seal member. In addition, vibration and warping or dimensional variation may occur, thus also potentially causing twisting and/or misalignment of the seal member and sealing interface. If the seal member is misaligned relative to a sealing interface, the uniform sealing compression, and thus, sealing integrity may be compromised.

SUMMARY

One embodiment of the invention relates to a filter assembly. The filter assembly includes a filter element including filter media fitted between a first endplate and a second endplate and a seal member having an oval profile. The first endplate includes an opening that allows fluid to flow into or out of the filter media. The filter media allows a working fluid to be filtered through the filter media. The seal member is fitted on the first endplate and configured to seal with a filter housing. The seal member includes an inner perimeter and an outer perimeter including a plurality of outwardly curved surfaces.

Another embodiment of the invention relates to a filter assembly. The filter assembly includes a filter element including filter media fitted between a first endplate and a second endplate and a seal member having an oval profile. The first endplate includes an opening that allows fluid to flow into or out of the filter media. The filter media allows a working fluid to be filtered through the filter media. The seal member is fitted on the first endplate and configured to seal with a filter housing. The seal member includes an inner perimeter and an outer perimeter including a plurality of inwardly curved surfaces.

Another embodiment relates to a filter assembly comprising a filter housing and a filter element. The filter housing includes a boss surrounding an opening within the filter housing. The filter element is releasably installed within the filter housing. The filter element comprises a first endplate, a second endplate, and filter media fitted between the first endplate and the second endplate. The first endplate includes an opening that allows a working fluid to flow into or out of the filter media. The filter media allows the working fluid to be filtered through the filter media. A seal member having an oval profile is disposed on the first endplate and is configured to seal with the filter housing. The seal member comprising a perimeter comprises a plurality of curved surfaces which deviate from the oval profile. The seal member interfaces with a surface of the boss when the filter element is installed within the filter housing. The interfacing of the seal member with the surface of the boss provides sealing between the filter element and the filter housing.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, a filter assembly that includes a unique sealing configuration between a filter and a housing is shown. A seal interface is provided between one end of a filter and one end of a mating head or component of a housing. The filter has a protrusion having an oval shaped profile with a gasket around its outer perimeter. For the mating component, a housing has a portion with a boss having an oval shaped profile to seal against the protrusion of the filter. The seal interface described herein can provide a keying feature which can be helpful to ensure that consistent contact pressure around the perimeter of the seal member is maintained. The seal interface also aids in ensuring that the correct filter is being installed and can help make installation easier.

Figure 1:
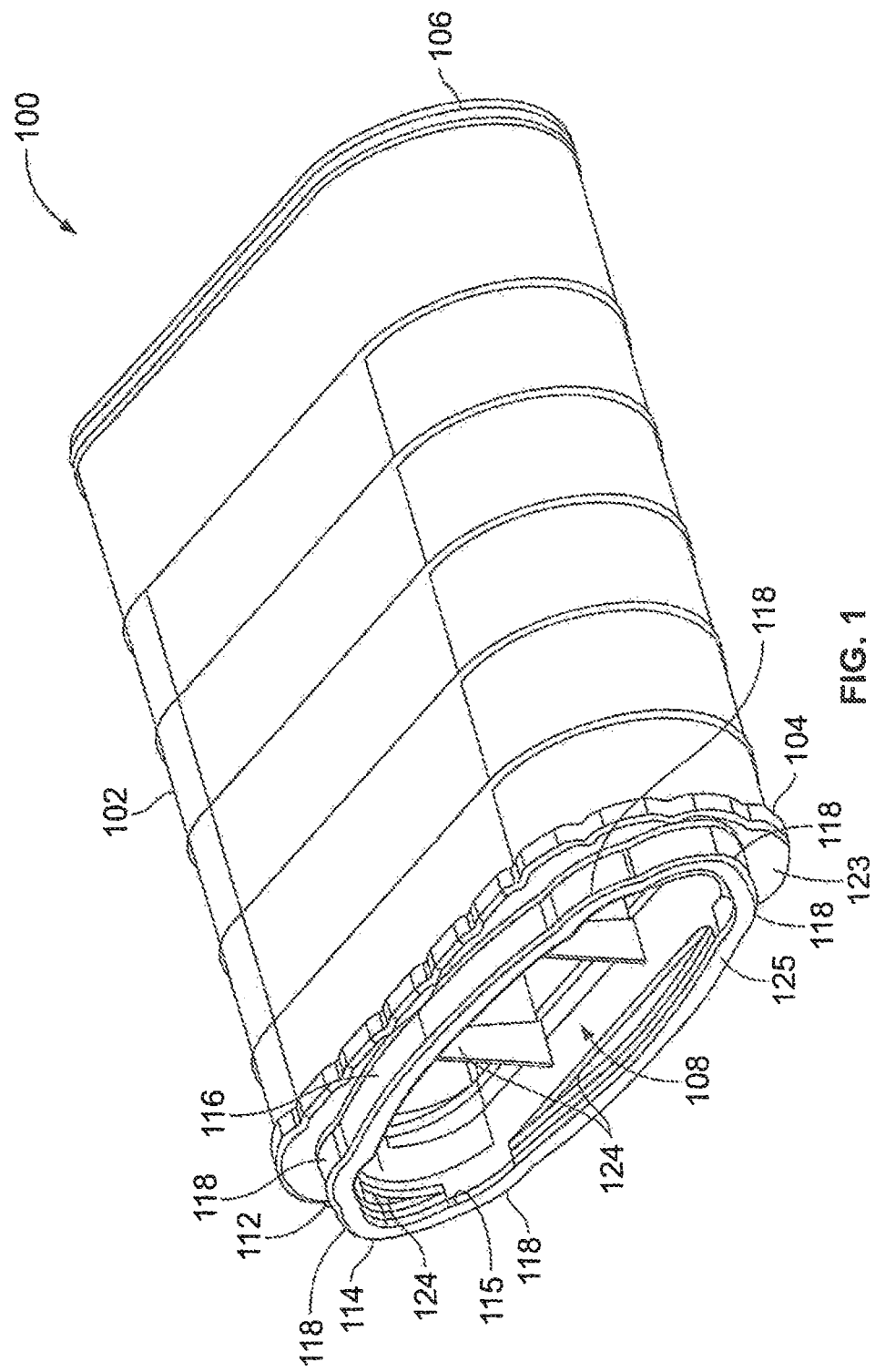
FIG. 1 shows a perspective view of a filter element, according to an example embodiment.

Referring to FIG. 1, a filter element is shown according to one embodiment. The filter element 100 is mounted in a filter housing (not shown). The filter element 100 includes filter media 102 configured to filter a working fluid. The filter media 102 is fitted between a first endplate 104 and a second endplate 106. As used herein, the term "endplate" should be interpreted broadly to cover a variety of arrangements. For example, the endplates 104, 106 can comprise molded polyurethane structures at the ends of the filter media 102, as well as other structures which are separately formed and then physically coupled to the filter media 102. The first endplate 104 includes an opening 108 that allows fluid to into or out of the filter media 102.

The first endplate 104 includes a main surface (not shown) including a spud (not shown) having an oval shaped profile protruding outward from the main surface. The spud surrounds the opening 108. A seal member 112 having an oval profile is disposed about an outer surface of the spud. The seal member 112 is a gasket that is oval shaped. As described further herein, the oval profile defines a general oval shape with inwardly and outwardly curved shapes along the perimeter thereof. The oval profile includes a major axis and a minor axis intersecting at the center of the oval profile. The major axis is defined as a line segment that runs through the center and both foci of the oval profile of the seal member 112, with ends at the widest points of the perimeter. The minor axis is defined as a line segment that runs perpendicular to the major axis and through the center of the oval profile of the seal member 112. The seal member 112 includes a longitudinal axis 120 and a transverse axis 110 (shown in FIG. 2). The longitudinal axis 120 extends along and beyond the major axis of the oval profile of the seal member 112. The transverse axis 110 extends along and beyond the minor axis of the seal member 112. In one embodiment, the seal member 112 is a slip-on gasket that may be attached to the spud through an interference fit between the seal member 112 and spud. In other embodiments, the seal member 112 is overmolded onto the spud. The seal member 112 is made from a resilient and flexible material capable of creating a seal between the filter element 100 and a filter housing.

Figure 3:
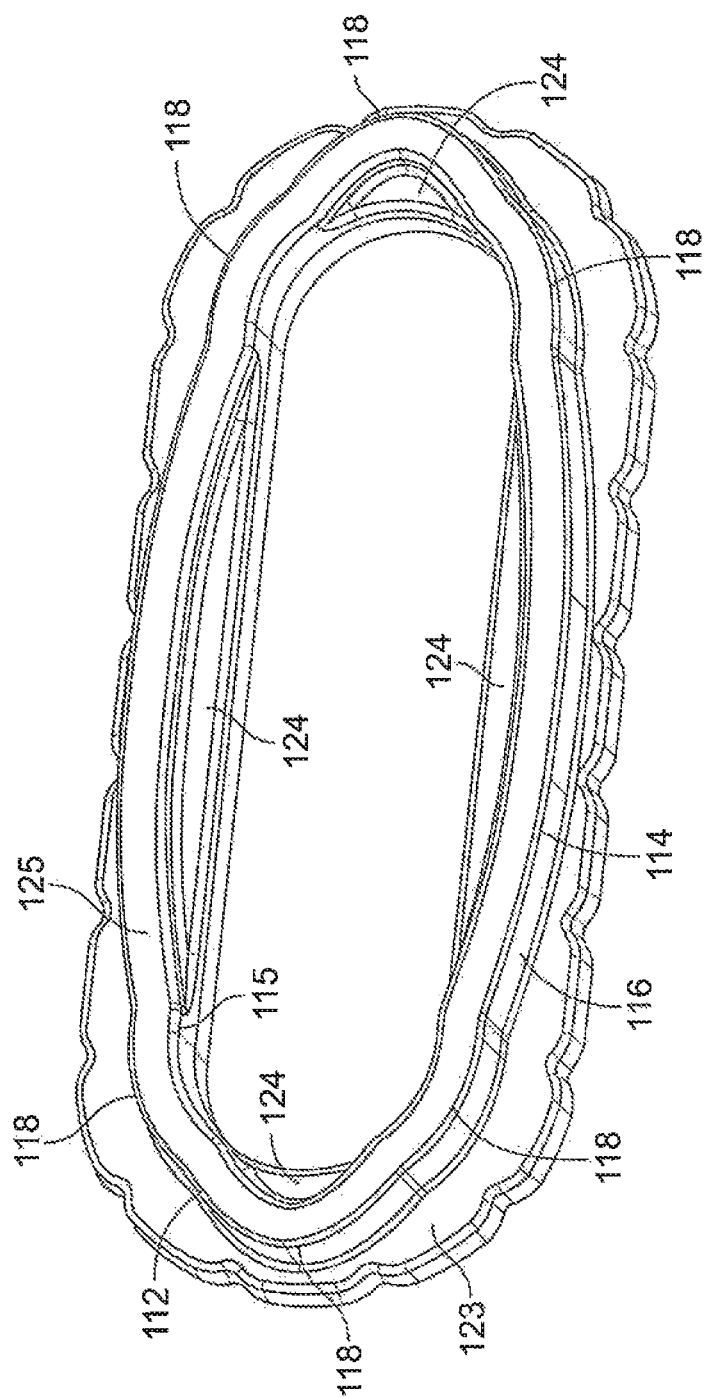
FIG. 3 shows a perspective view of an endcap with a seal member extending therefrom for use with a filter element of the filter element of FIG. 1.

The filter element 100 is releasably housed within a filter housing. The filter element 100 is inserted in an axial direction to mount onto the filter housing. The filter housing has a mounting component that includes a boss that surrounds an opening in the filter housing. When the filter element 100 is connected to the filter housing, the opening in the filter housing is in fluid communication with the opening 108 of the first endplate 104 of the filter element 100. The boss mates with the spud and seals against the seal member 112. As shown in FIG. 3, the seal member 112 comprises a base surface 123, an end surface 125, and an outer perimeter 114 including a sealing surface 116 extending from the base surface 123 to the end surface 125. The sealing surface 116 is configured to interface with an inner surface of the boss. The seal member 112 thus provides a seal interface between the filter element 100 and the filter housing. The sealing interface provides sealing between the dirty and the clean sides of the filter element. In use, for example, the filter element 100 is connected to the filter housing when the spud is inserted into the boss, such that the boss surrounds the spud and seal member 112. The boss on the filter housing is dimensioned specifically to ensure sealing capability with the seal member 112 on the filter element 100.

Figure 2:
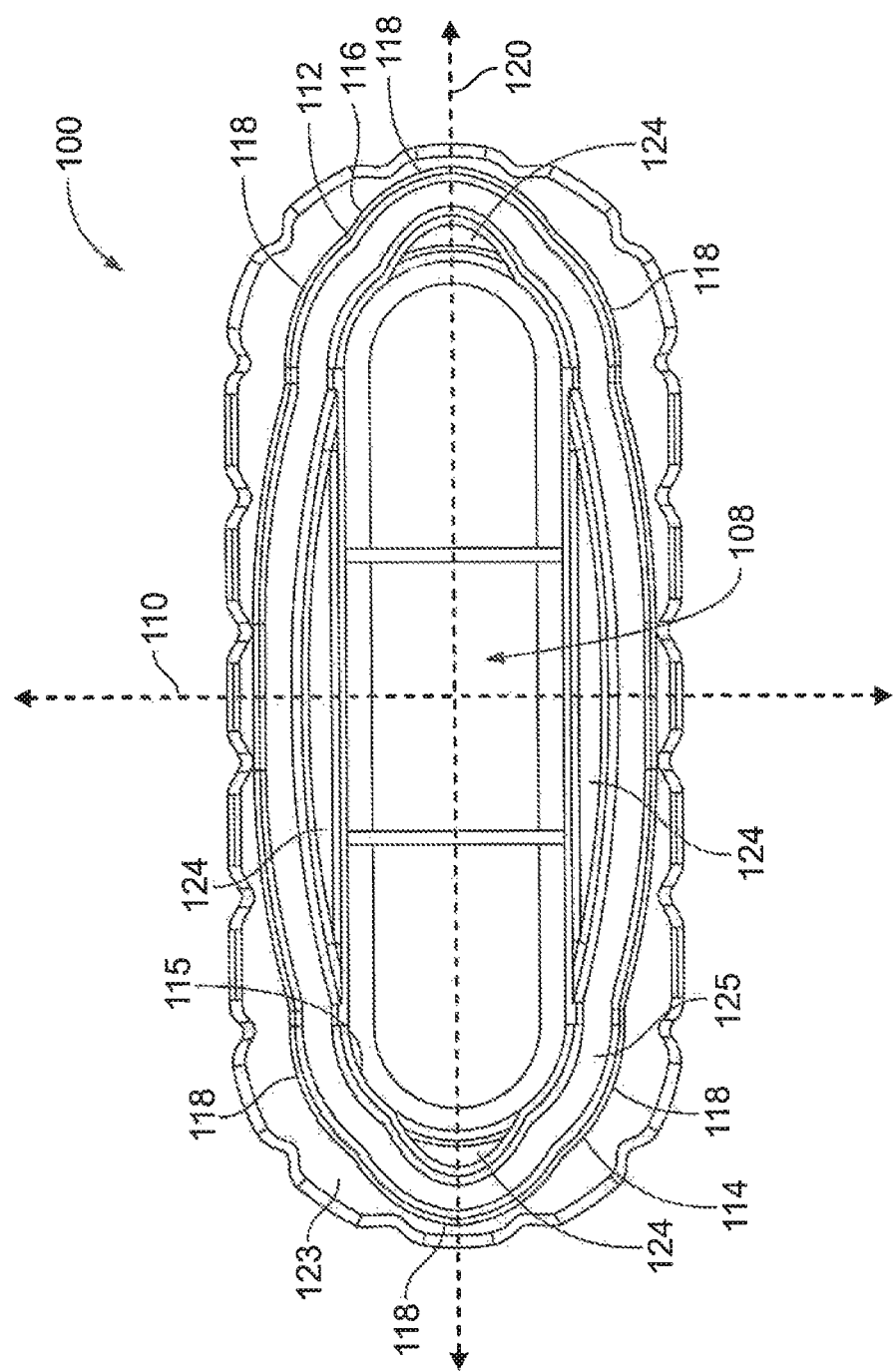
FIG. 2 shows an end view of the filter element of FIG. 1.

Referring to FIGS. 2 and 3, an end view and a perspective view of the seal member 112 are shown, respectively. The seal member 112 provides a contoured profile formed on the outer perimeter 114 to ensure proper alignment of the seal member 112 and a corresponding sealing interface formed in the boss on the filter housing. The contoured profile includes a plurality of outwardly curved surfaces 118 symmetrically centered about one or both of the longitudinal axis 110 and transverse axis 120 (shown in FIG. 2) of the seal member 112. In other embodiments, the seal member 112 includes only one outwardly curved surface 118. In other embodiments, the outwardly curved surfaces 118 are not symmetric about the longitudinal and/or transverse axes 110, 120. To maintain uniform seal cross-section, the seal member 112 additionally includes corresponding outwardly curved surfaces on an inner perimeter 115 thereof such that the thickness of the seal member 112 is uniform throughout. In other embodiments, the seal member 112 does not include corresponding outwardly curved surfaces on the inner perimeter 115.

In a particular set of implementations, the outwardly curved surfaces 118 extend between approximately 15 and 30 millimeters (mm) in length along the outer perimeter 114, and more generally not less than 10 mm and no greater than 50 mm in length. In other embodiments, the outwardly curved surfaces 118 can extend outside of this range. The outwardly curved surfaces 118 may have a depth inside or outside the basic ellipse or oval shape approximately between 10 mm and 20 mm, and more generally not less than 5 mm and no greater than 25 mm. In other embodiments, the outwardly curved surfaces 118 have a depth outside of this range. Although not shown, the boss on the filter housing includes correspondingly shaped inwardly curved surfaces to mate with the outwardly curved surfaces 118 of the seal member 112.

The seal member 112 also includes indentations 124 formed on the inner perimeter 115. The indentations 124 are inset from the end surface 125 of the seal member 112. The indentations 124 create a clearance to avoid flow disturbances or a reduced pleat depth in the filter assembly.

Figure 4:
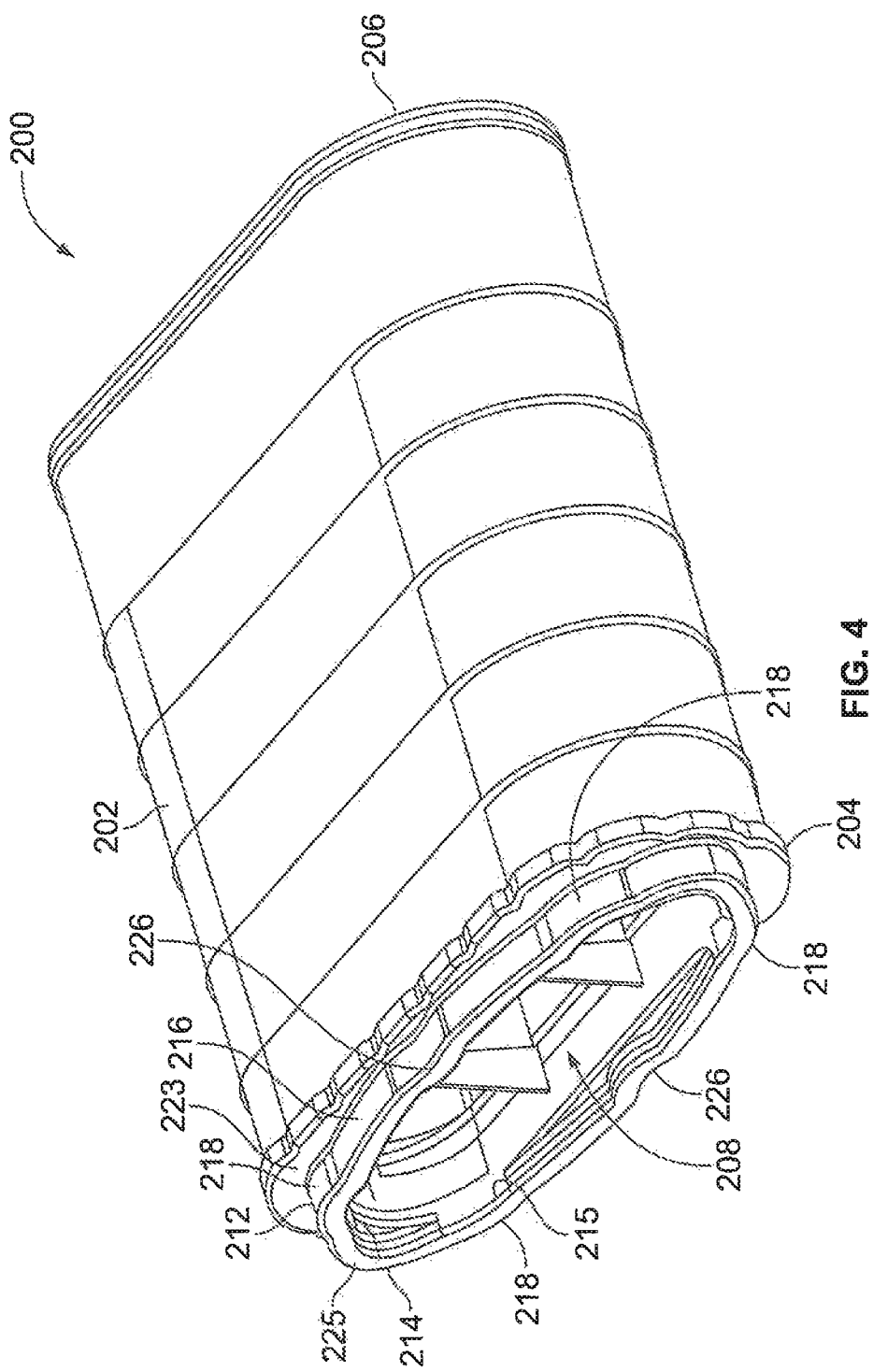
FIG. 4 shows a perspective view of a filter element, according to another embodiment.

Referring to FIG. 4, a filter element is shown according to another embodiment. The filter element 200 fits within a filter housing (not shown). The filter element 200 includes filter media 202 configured to filter a working fluid. The filter media 202 is fitted between a first endplate 204 and a second endplate 206. The first endplate 204 includes an opening 208 that allows fluid to into or out of the filter media 202.

The first endplate 204 includes a main surface (not shown) including a spud (not shown) protruding outward from the main surface. The spud surrounds the opening 208. A seal member 212 is disposed about an outer surface of the spud. The seal member 212 is a gasket that is oval shaped. As described further herein, the oval profile includes a general oval shape with inwardly and outwardly curved shapes along the perimeter thereof. The oval shape includes a major axis and a minor axis intersecting at the center of the oval. The major axis is defined as a line segment that runs through the center and both foci of the oval, with ends at the widest points of the perimeter. The minor axis is defined as a line segment that runs perpendicular to the major axis and through the center of the oval shape. The seal member 212 includes a longitudinal axis 220 and a transverse axis 210 (shown in FIG. 5). The longitudinal axis 220 extends along and beyond the major axis of the oval profile of the seal member 212. The transverse axis 210 extends along and beyond the minor axis of oval profile of the seal member 212. In one embodiment, the seal member 212 is a slip-on gasket that may be attached to the spud through an interference fit between the seal member 212 and spud. In other embodiments, the seal member 212 is overmolded onto the spud. The seal member 212 is made from a resilient and flexible material capable of creating a seal between the filter element 200 and a filter housing.

Figure 6:
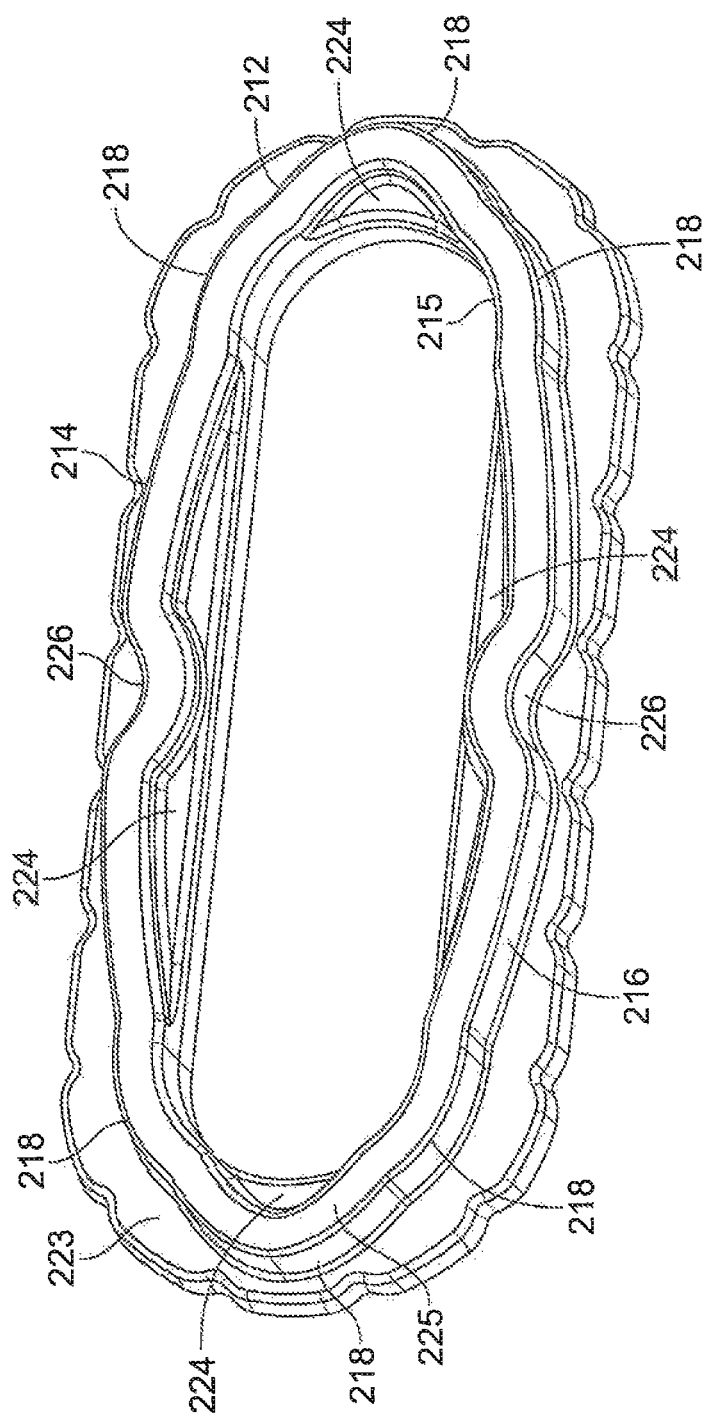
FIG. 6 shows a perspective view of an endcap with a seal member extending therefrom for use with a filter element of the filter element of FIG. 4.

The filter element 200 is releasably housed within a filter housing. The filter element 200 is inserted in an axial direction to mount onto the filter housing. The filter housing has a mounting component that includes a boss that surrounds an opening in the filter housing. When the filter element 200 is connected to the filter housing, the opening in the filter housing is in fluid communication with the opening 208 of the first endplate 204 of the filter element 200. The boss mates with the spud and seals against the seal member 212. As shown in FIG. 6, the seal member 212 comprises a base surface 223, an end surface 225, and an outer perimeter 214 including a sealing surface 216 extending from the base surface 223 to the end surface 225. The sealing surface 216 is configured to interface with an inner surface of the boss. The seal member 212 thus provides a seal interface between the filter element 200 and the filter housing. The seal interface provides sealing between the dirty and the clean sides of the filter element. In use, for example, the filter element 200 is connected to the filter housing when the spud is inserted into the boss, such that the boss surrounds the spud and seal member 212. The boss on the filter housing is dimensioned specifically to ensure sealing capability with the seal member 212 on the filter element 200.

Figure 5:
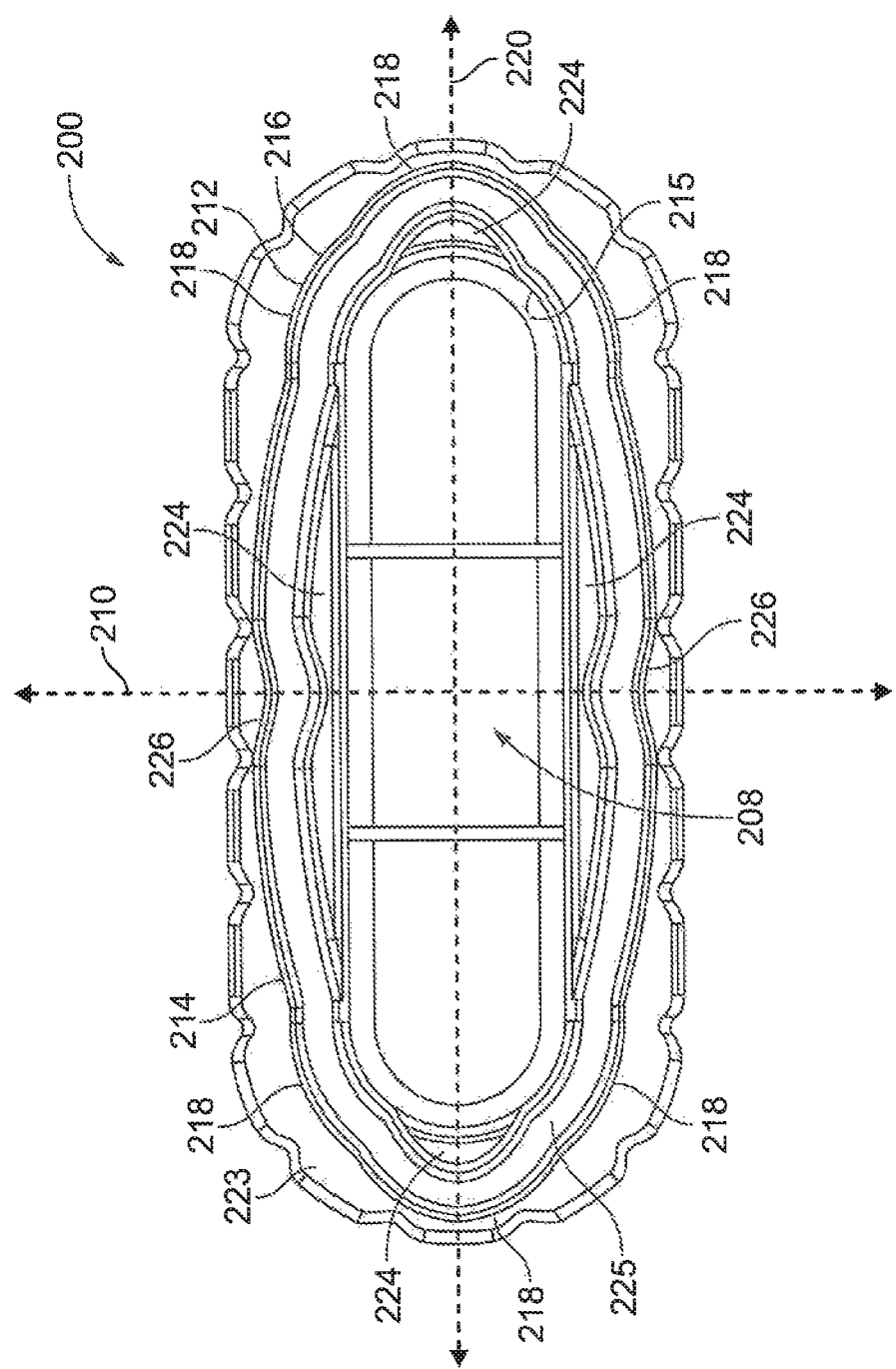
FIG. 5 shows an end view of the filter element of FIG. 4.

Referring to FIGS. 5 and 6, an end view and a perspective view of the seal member 212 are shown, respectively. The seal member 212 provides a contoured profile formed on the outer perimeter 214 to ensure proper alignment of the seal member 212 and a corresponding sealing interface formed in the boss on the filter housing. The contoured profile includes a plurality of outwardly curved surfaces 218 symmetrically centered about one or both of the longitudinal axis 210 and transverse axis 220 (shown in FIG. 5) of the seal member 212. In other embodiments, the seal member 212 includes only one outwardly curved surface 218. In other embodiments, the outwardly curved surfaces 218 are not symmetric about the longitudinal and/or transverse axes 210, 220. To maintain uniform seal cross-section along the perimeter of the seal member 212, the seal member 212 additionally includes corresponding outwardly curved surfaces on an inner perimeter 215 thereof such that the thickness of the seal member 112 is uniform throughout. In other embodiments, the seal member 212 does not include corresponding outwardly curved surfaces on the inner perimeter 215.

The contoured profile of seal member 212 also includes a plurality of inwardly curved surfaces 226 symmetrically centered about one or both of the longitudinal axis 210 and transverse axis 220 (shown in FIG. 5) of the seal member 212. In other embodiments, the seal member 212 includes only one inwardly curve surface 226. In other embodiments, the inwardly curved surfaces 226 are not symmetric about the longitudinal and/or transverse axes 210, 220. To maintain a uniform seal cross-section along the perimeter of the seal member 212, corresponding inwardly curved surfaces on the inner perimeter 215 are included. In other embodiments, the seal member 212 does not include corresponding inwardly curved surfaces on the inner perimeter 215.

In a particular set of implementations, the outwardly curved surfaces 218 and the inwardly curved surfaces 226 extend between approximately 15 and 30 mm in length along the outer perimeter 214, and more generally not less than 10 mm and no greater than 50 mm in length. In other embodiments, the curved surfaces 218, 226 can extend outside of this range. The outwardly curved surfaces 218 and inwardly curved surfaces 226 may have a depth inside or outside the basic ellipse or oval shape approximately between 10 mm and 20 mm, and more generally not less than 5 mm and no greater than 25 mm. In other embodiments, the curved surfaces 218, 226 have a depth outside of this range. Although not shown, the boss on the filter housing includes correspondingly shaped inwardly curved surfaces to mate with the curved surfaces 218, 226 of the seal member 212.

The seal member 212 also includes indentations 224 formed on the inner perimeter 215. The indentations 224 are inset from the end surface 225 of the seal member 212. The indentations 224 create a clearance to avoid flow disturbances or a reduced pleat depth in the filter assembly.

Figure 7:
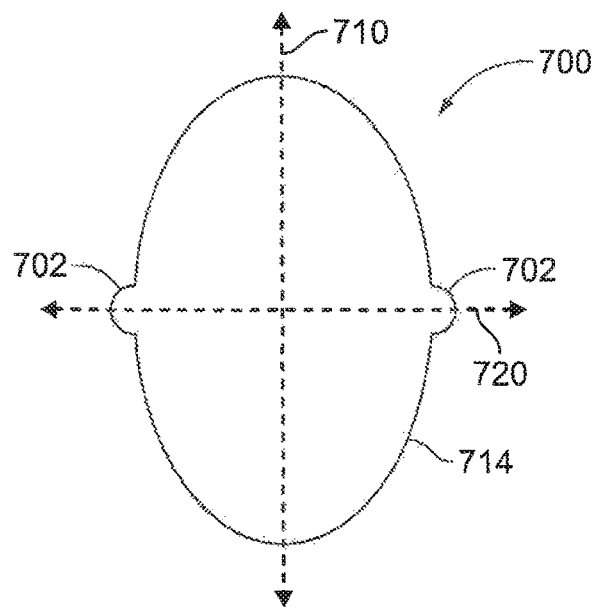
FIG. 7 shows a schematic view of a seal member profile for use with a filter element, according to another embodiment.

Referring to FIGS. 7-10, various embodiments of seal member profiles are shown. Referring to FIG. 7, a seal member profile 700 is shown according to an example embodiment. The seal member profile 700 includes two protrusions 702 (e.g., outwardly curved surfaces) formed on the outer perimeter 714. The protrusions 702 are positioned on the transverse axis 720 and symmetrically about both the longitudinal axis 710 and the transverse axis 720 such that filter element could be rotated to two positions for installation onto a filter housing (e.g., two degrees of freedom for proper installation).

Figure 8:
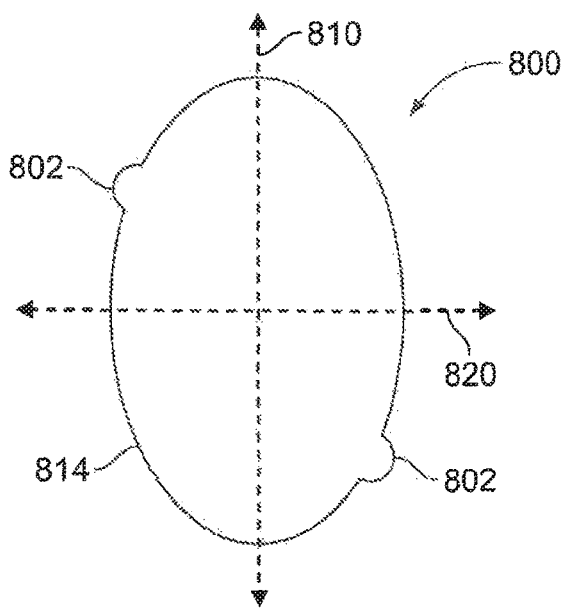
FIG. 8 shows a schematic view of a seal member profile for use with a filter element, according to another embodiment.

Referring to FIG. 8, a seal member profile 800 is shown according to another example embodiment. The seal member profile 800 includes two protrusions 802 (e.g., outwardly curved surfaces) formed on the outer perimeter 814. The protrusions 802 are not symmetrically positioned about the longitudinal axis 810 or the transverse axis 820. However, the protrusions 802 are positioned such that the filter element could be rotated to two positions for installation onto a filter housing (e.g., two degrees of freedom for proper installation).

Figure 9:
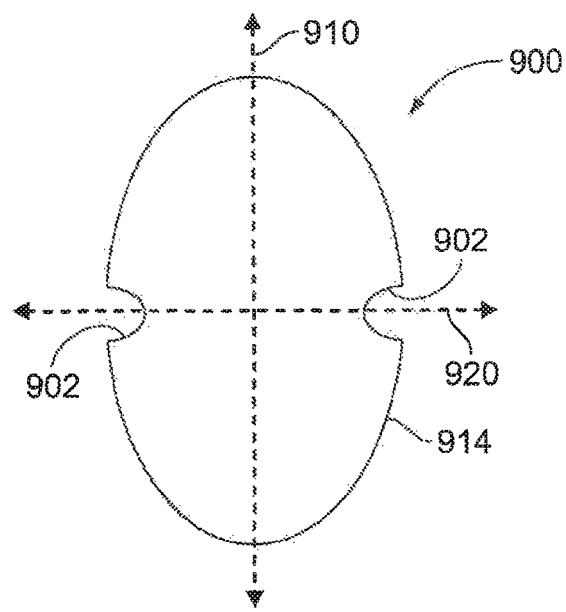
FIG. 9 shows a schematic view of a seal member profile for use with a filter element, according to another embodiment.

Referring to FIG. 9, a seal member profile 900 is shown according to another example embodiment. The seal member profile 900 includes two recesses 902 (e.g., inwardly curved surfaces) formed on the outer perimeter 914. The recesses 902 are positioned on the transverse axis 920 and symmetrically about both the longitudinal axis 910 and the transverse axis 920 such that the filter element could be rotated to two positions for installation onto a filter housing (e.g., two degrees of freedom for proper installation).

Figure 10:
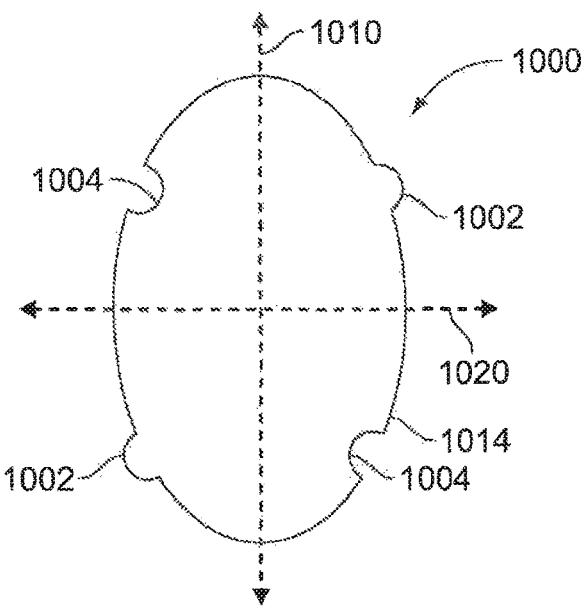
FIG. 10 shows a schematic view of a seal member profile for use with a filter element, according to another embodiment.

Referring to FIG. 10, a seal member profile 1000 is shown according to another example embodiment. The seal member profile 1000 includes two protrusions 1002 (e.g., outwardly curved surfaces) and two recesses 1004 (e.g., inwardly curved surfaces) formed on the outer perimeter 1014. The protrusions 1002 and recesses 1004 are not symmetrically positioned above the longitudinal axis 1010 or the transverse axis 1020. However, the protrusions 1002 and recesses 1004 are positioned such that the filter element could be rotated to two positions for installation onto a filter housing (e.g., two degrees of freedom for proper installation). Other various combinations of protrusions and recesses can be used to aid in alignment of a seal with a corresponding sealing interface.

Figure 11:
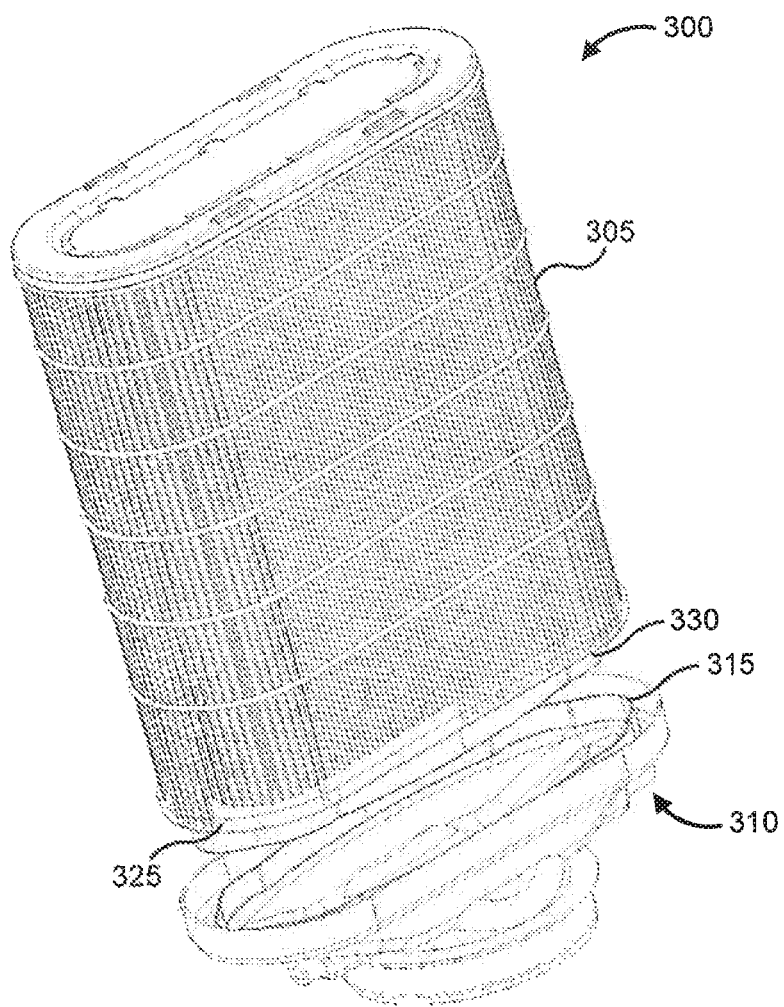
FIG. 11 shows a filter element according to another embodiment, separated from a mounting component of a filter housing.
Figure 12:
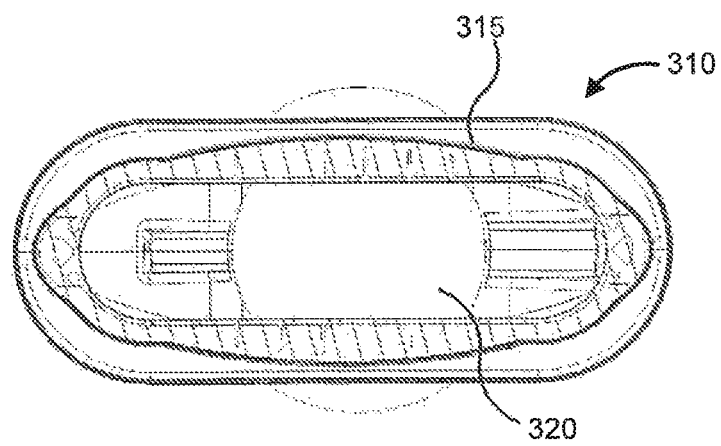
FIG. 12 is a top plan view of the mounting component of FIG. 11.

FIG. 11 shows a filter element 300 according to another embodiment, separated from a mounting component 310 of a filter housing. The filter element 300, which includes pleated filter media 305, is similar in many respects to the filter elements 100, 200 discussed herein and should be understood as including the features discussed with regard to these filter elements. The mounting component 310 of the filter housing includes a boss 315 that surrounds an opening 320 in the filter housing. As best shown in FIG. 12, the boss 315 possesses an oval shaped profile with inwardly and/or outwardly curved shapes along the perimeter thereof, with the profile matching the profile of the seal member of a first endplate 325 of the filter element 300. When the filter element 300 is connected to the filter housing, the opening 320 in the filter housing is in fluid communication with the opening of the first endplate 325 of the filter element 300. The boss 315 mates with a spud 330 of the first end plate 335 and via the matching profiles of the boss 315 and the seal member—seals against the seal member thereof.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

References herein to the positions of elements (e.g., "above," "below," etc.) are merely used to describe the orientation of various elements in the figures. It should be noted that the orientation of various elements may differ according to other example embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A filter element comprising:
    a first endplate;
    a second endplate;
    filter media fitted between the first endplate and the second endplate, the first endplate including an opening that allows a working fluid to flow into or out of the filter media, the filter media allowing the working fluid to be filtered through the filter media; and
    a seal member having an oval profile disposed on the first endplate and configured to seal with a filter housing, the seal member comprising an inner perimeter and an outer perimeter comprising a plurality of outwardly curved surfaces, the seal member further comprising a plurality of indentations formed on an inner perimeter thereof.

2. The filter element of claim 1, wherein the plurality of indentations is inset from an end surface of the seal member.

3. The filter element of claim 1, wherein the outwardly curved surfaces are symmetrically positioned about a longitudinal axis formed along a major axis of the oval profile of the seal member.

4. The filter element of claim 1, wherein the outwardly curved surfaces are symmetrically positioned about a transverse axis formed along a minor axis of the oval profile of the seal member.

5. The filter element of claim 1, wherein the outer perimeter of the seal member further comprises a plurality of inwardly curved surfaces.

6. The filter element of claim 5, wherein the outwardly curved surfaces and the inwardly curved surfaces are symmetrically positioned about a longitudinal axis formed along a major axis of the oval profile of the seal member.

7. The filter element of claim 5, wherein the outwardly curved surfaces and the inwardly curved surfaces are symmetrically positioned about a transverse axis formed along a minor axis of the oval profile of the seal member.

8. A filter element comprising:
    a first endplate;
    a second endplate;
    filter media fitted between the first endplate and the second endplate, the first endplate including an opening that allows a working fluid to flow into or out of the filter media, the filter media allowing the working fluid to be filtered through the filter media; and
    a seal member having an oval profile disposed on the first endplate and configured to seal with a filter housing, the seal member comprising an inner perimeter and an outer perimeter comprising a plurality of inwardly curved surfaces, the seal member further comprising a plurality of indentations formed on an inner perimeter thereof.

9. The filter element of claim 8, wherein the plurality of indentations is inset from an end surface of the seal member.

10. The filter element of claim 8, wherein the inwardly curved surfaces are symmetrically positioned about a longitudinal axis formed along a major axis of the oval profile of the seal member.

11. The filter element of claim 8, wherein the inwardly curved surfaces are symmetrically positioned about a transverse axis formed along a minor axis of the oval profile of the seal member.

12. The filter element of claim 8, wherein the outer perimeter of the seal member further comprises a plurality of outwardly curved surfaces.

13. The filter element of claim 12, wherein the outwardly curved surfaces and the inwardly curved surfaces are symmetrically positioned about a longitudinal axis formed along a major axis of the oval profile of the seal member.

14. The filter element of claim 12, wherein the outwardly curved surfaces and the inwardly curved surfaces are symmetrically positioned about a transverse axis formed along a minor axis of the oval profile of the seal member.

15. A filter assembly, comprising:
a filter housing including a boss surrounding an opening within the filter housing; and
a filter element releasably installed within the filter housing, the filter element comprising:
- a first endplate;
- a second endplate;
- filter media fitted between the first endplate and the second endplate, the first endplate including an opening that allows a working fluid to flow into or out of the filter media, the filter media allowing the working fluid to be filtered through the filter media; and
- a seal member having an oval profile disposed on the first endplate and configured to seal with the filter housing, the seal member comprising a perimeter comprising a plurality of curved surfaces which deviate from the oval profile, the seal member interfacing with a surface of the boss when the filter element is installed within the filter housing, the interfacing of the seal member with the surface of the boss providing sealing between the filter element and the filter housing.

16. The filter assembly of claim 15, wherein the plurality of curved surfaces are curved inwardly relative to the oval perimeter.

17. The filter assembly of claim 15, wherein the plurality of curved surfaces are curved outwardly relative to the oval perimeter.

18. The filter assembly of claim 15, wherein the plurality of curved surfaces include inwardly curved surfaces and outwardly curved surfaces.

19. The filter assembly of claim 15, wherein the plurality of curved surfaces are located on an outer perimeter of the seal member, and wherein the seal member interfaces with an inner surface of the boss when the filter element is installed within the filter housing.

20. The filter assembly of claim 15, wherein the plurality of curved surfaces are symmetrically positioned about an axis of the seal member.

* * * * *